United States Patent
De Andrade Coutinho Filho et al.

(10) Patent No.: US 11,684,060 B2
(45) Date of Patent: Jun. 27, 2023

(54) WEED INACTIVATION DEVICE

(71) Applicant: Zasso Group AG, Baar (CH)

(72) Inventors: Sergio De Andrade Coutinho Filho, Indaiatuba (BR); Jose Antenor Pomilio, Campinas (BR); Bruno Valverde, Campinas (BR); Diego Teruo Mendes De Souza, Campinas (BR)

(73) Assignee: Zasso Group AG, Zug (CH)

( * ) Notice: Subject to any disclaimer, the term of this patent is extended or adjusted under 35 U.S.C. 154(b) by 528 days.

(21) Appl. No.: 16/611,401

(22) PCT Filed: Nov. 27, 2017

(86) PCT No.: PCT/IB2017/001456
§ 371 (c)(1),
(2) Date: Nov. 6, 2019

(87) PCT Pub. No.: WO2019/102243
PCT Pub. Date: May 31, 2019

(65) Prior Publication Data
US 2020/0205395 A1    Jul. 2, 2020

(51) Int. Cl.
*H02H 7/10* (2006.01)
*H02M 11/00* (2006.01)
*A01M 21/04* (2006.01)

(52) U.S. Cl.
CPC ............ *A01M 21/046* (2013.01); *H02H 7/10* (2013.01); *H02M 11/00* (2013.01)

(58) Field of Classification Search
CPC .......... H02M 7/04; H02M 7/219; H02M 7/48; H20M 11/00; A01M 21/046
See application file for complete search history.

(56) References Cited

U.S. PATENT DOCUMENTS

| 4,177,603 A | 12/1979 | Dykes |
| 4,338,743 A | 7/1982 | Gilmore |
| 4,428,150 A | 1/1984 | Geiersbach et al. |
| 5,210,719 A | 5/1993 | Lawrence |

(Continued)

FOREIGN PATENT DOCUMENTS

| BR | PI0502291 A | 1/2007 |
| CH | 707 476 A2 | 7/2014 |

(Continued)

OTHER PUBLICATIONS

International Search Report in PCT/IB2017/001456, dated Nov. 13, 2018.

(Continued)

*Primary Examiner* — Nguyen Tran
(74) *Attorney, Agent, or Firm* — Hahn Loeser & Parks LLP; Bret A. Hrivnak (57) ABSTRACT

The invention relates to a weed inactivation device, comprising at least one electrode, whereby at least one electrode is directed to the weed. The electrode is supplied with electrical energy by an electrical power supply, containing an h-bridge inverter for DC/AC conversion to create rectangular wave AC-current. The inversion takes place at frequencies above 1.0 kHz. The weed activation device enables weed control without utilization of poisonous herbicides.

1 Claim, 8 Drawing Sheets

(56) References Cited

U.S. PATENT DOCUMENTS

| | | | |
|---|---|---|---|
| 5,959,412 A | 9/1999 | Ushijima | |
| 6,191,961 B1 | 2/2001 | Mous | |
| 6,717,281 B1* | 4/2004 | Brandon | B60W 20/00 290/400 |
| 6,972,531 B2* | 12/2005 | Krummel | H05B 41/295 315/105 |
| 9,936,686 B2 | 4/2018 | Crisp et al. | |
| 2006/0265946 A1 | 11/2006 | Schwager et al. | |
| 2007/0132406 A1 | 6/2007 | Komatsu et al. | |
| 2014/0362616 A1 | 12/2014 | An | |
| 2018/0139947 A1 | 5/2018 | Albert et al. | |
| 2020/0205395 A1 | 7/2020 | De Andrade Coutinho Filho et al. | |

FOREIGN PATENT DOCUMENTS

| | | |
|---|---|---|
| CN | 2934058 Y | 8/2007 |
| CN | 107276381 A | 10/2017 |
| DE | 10 2015 209879 A1 | 12/2016 |
| EP | 1588476 B1 | 12/2010 |
| JP | H05056740 A | 3/1993 |
| JP | H07000089 A | 1/1995 |
| JP | H08069935 A | 3/1996 |
| JP | 2000200834 A | 7/2000 |
| JP | 2001126935 A | 5/2001 |
| JP | 2003524361 A | 8/2003 |
| JP | 2003347127 A | 12/2003 |
| JP | 2005108841 A | 4/2005 |
| JP | 2016152686 A | 8/2016 |
| WO | 2006046405 A1 | 5/2006 |
| WO | 2013051276 A1 | 4/2013 |
| WO | 2015119523 A1 | 8/2015 |
| WO | 2016/016627 A1 | 2/2016 |
| WO | 2018050138 A1 | 3/2018 |

OTHER PUBLICATIONS

Gilmore, Christopher Kenneth, Electro-aerodynamic thrust for fixed-wing aircraft propulsion, Massachusetts Institute of Technology Libraries, Jul. 11, 2017, 314 pages.

Peretz, et al., The self-adjusting current-fed push-pull parallel-resonant inverter as a high frequency AC bus driver, Conference: Electrical and Electronics Engineers in Israel, 2004, 14 pages.

* cited by examiner

WEED INACTIVATION DEVICE

CROSS-REFERENCE TO RELATED APPLICATIONS

This application is the National Stage of PCT/IB2017/001456 filed on Nov. 27, 2017, the disclosure of which is incorporated by reference. The international application under PCT article 21(2) was published in English.

BACKGROUND OF THE INVENTION

Field of the Invention

The invention relates to a weed inactivation device, comprising at least one electrode, whereby the at least one electrode is directed to the weed.

Description of Related Art

To control weed in plantations or in crop fields it is well known to utilize herbicides, which to a certain degree have plant specific effects. Whereas wanted crops are less sensitive to the used herbicides, the unwanted weeds deteriorate due to the herbicide poisonous effect. To control the herbicide pollution of the environment it is also well known to produce these in a manner that they deteriorate chemically by means of ultra violet radiation by the sun or by microbial metabolism. Though herbicides are biodegradable or degrade by physical means, herbicides pollution is a serious threat to the biosphere.

In order to overcome herbicide pollution, it would be desirable to inactivate unwanted weed by other means then poisonous substances.

BRIEF SUMMARY OF THE INVENTION

This particular problem can be solved by a weed inactivation device comprising at least one electrode, whereby the at least one electrode is directed to the weed.

Ideally, the efficacy of plant electrocution can be considered to be binary, namely to have two stets: the plant is dead or it is not dead. The efficacy can be considered as the relation between the fatal energy consumption needed at the individual plant's root and the volume of the root system. This relation might vary a little from plant to plant and due to conditions (temperature, humidity, etc.), but fatal energy consumption needed is proportional to plant's root volume:

$$C(n) = \frac{E(n \text{ root})}{Ap(n \text{ root})}$$

in which
   C(n) is the Electrical Sensibility Constant of that specific plant, in determined conditions;
   E (n root) is the Energy Consumption at the N plant root;
   Ap (n root) is the Volume of the N plant's root system.

From a theoretical perspective, plants can be seen as two serial resistances. Efficacy on systemic plant control is direct consequence of killing the plant's root system, not the air system. A plant might recover if its air system is somewhat damaged, but it will certainly die if its root system becomes unable to send nutrients to the rest of the plant, that necessarily will perish from nutrient deficiency.

Total plant resistance [Rn] is a sum of two resistances, Rn air and Rn root.

$$Rn = Rn \text{ air} + Rn \text{ root}$$

Figure 21:
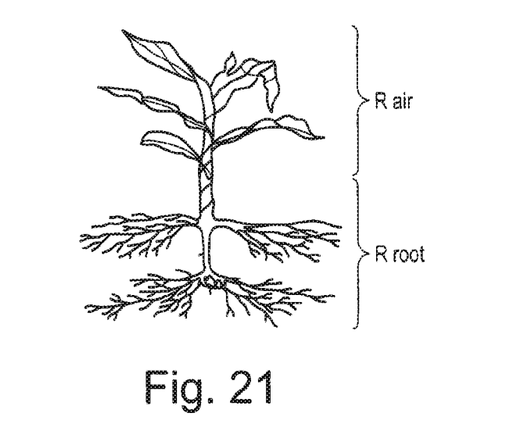
FIG. 21 depicts the different resistances of plant parts.

Rn air: Decreases individual plant sensibility to electric weeding;
Rn root: Increases individual plant sensibility to electric weeding;
the Rn air stands for the electrical resistance of the plant parts in the air and Rn root stands for the electrical resistance of the plant parts in the soil (FIG. 21).

Different plant species have individual different minimal plant energy consumption. Considering total plant resistance [Rn] as the sum of two resistances, Rn air and Rn root, as a direct consequence of Ohm's Law, namely the electrical tension U is proportional to the electrical current I and to the electrical resistance R in a system.

$$\text{Ohms Law: } U = I \ast R$$

From that can be derived that the amount of current (I) flowing through the plant as a whole will be U/Rn.

As power is given by:

$$P = V \ast I \text{ and energy is}$$

power applied in time, given by:

$$E = P \ast t$$

Therefore, given a set voltage U and a set amount of time applying this voltage, a lower total resistance Rn means more energy flow through the plant as a whole, according to the equation below:

$$E = \frac{V^2 \ast t}{R_n}$$

Therefore, plant total resistances increases are inversely proportional to energy consumption.

In connection with the individual and different plant energy consumption per individual plant species the individual plant sensibility due to air system volume/root system volume ratio is also variant. Given a set total plant resistance Rn, and a set energy applied, as the goal is to kill the root system of the plant and not the air system, the energy consumed at the root system (Er) is influenced by the energy consumed at the air system (Ea):

$$E = Ea + Er = \frac{V_{air}^2 \ast t}{R_{n \text{ air}}} + \frac{V_{root}^2 \ast t}{R_{n \text{ root}}}$$

Therefore, total energy consumed at the root system is:

$$Er = E - \frac{V_{air}^2 \ast t}{R_{n \text{ air}}}$$

$$Er = E - \frac{I^2 \ast R_{n \text{ air}}^2 \ast t}{R_{n \text{ air}}}$$

$$Er = E - I^2 \ast R_{n \text{ air}} \ast t$$

Where the current (I), time applied (t) and total energy flow (E) are set.

Because of this, a lower air system resistance ($R_{n \text{ air}}$) means more energy being consumed at the roots and consequently a higher individual plant sensitivity to electric weeding. As total resistance (Rn) is the sum of the air system resistance and the root system resistance $Rn = Rn\ air + Rn\ root$ Considering the plant is dead if the roots are killed independently of what happens to the air system, it is true that for a given total resistance (Rn), a higher root system resistance means lower air system resistance. Therefore, Rn air decreases individual plant sensibility to electric weeding as Rn air is higher and Rn root increases individual sensibility to electric weeding as Rn root is higher.

It can also be found that the existence of more leaves on a plant individual means more contact area, therefore more leaves mean less air resistance and more roots mean more contact area, therefore more roots mean less root resistance.

DETAILED DESCRIPTION OF THE INVENTION

In the following the electrical variables of a perfect plant electrocuting system and their interactions are defined on a mathematical base. With the following mathematical description, the relations between the resistances of the system and how different soil and plants might affect the efficacy of the system can be further understood. Conclusions should be able to further explain and determine factors of influence for the system's efficacy. In some cases, a single applicator might touch more than one plant at the same time. In those cases, energy consumed will be divided through all plants touched by the applicator. The equation to define Equivalent Resistance for parallel resistances is:

$$\frac{1}{Rp_t} = \Sigma \frac{1}{Rp_n}$$

Figure 1:
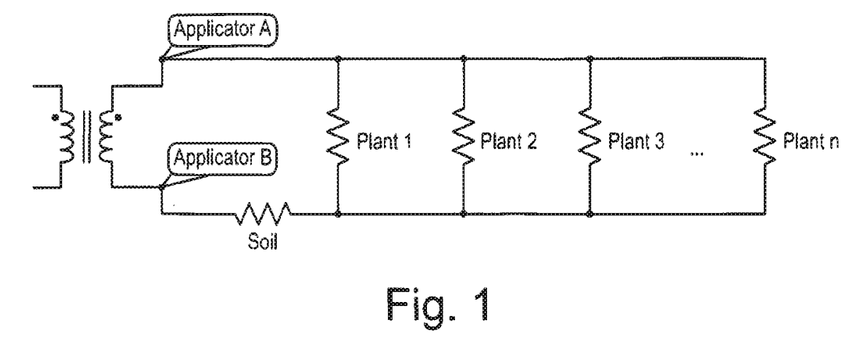
FIG. 1 is a diagram of a plant electrocution resistive circuit formed by the soil resistance summed up with the parallel resistances composed by plants touched by a single applicator.

The plant electrocution resistive circuit is formed by the soil resistance summed up with the parallel resistances composed by plants touched by a single applicator, as in diagram of FIG. 1.

An ideal system plant electrocution should have the following features, with respect to FIG. 1:
- the voltage of the system is defined by the secondary side of the transformer,
- the system delivers the nominal power all the time,
- the voltage adjusts itself immediately to ensure it operates at nominal power when the output resistive load is varying,
- the power factor should be 1.

This means that, at this ideal system:

$Pt = V * I_T$

In the following the individual plant energy consumption in a system of plants is looked at. Through lab tests it was found that the lethal amount of energy for an average 0.15 m broad-leafed plant usually varies from 100-1,000 (one hundred to one thousand) joules. In the perfect plant electrocution equipment, the transformer's voltage U would adjust itself every moment for the varying total resistance Rt to ensure that, with a unitary power factor, its power consumption equals the total power capacity. The actual power available for plant electrocution is the total power delivered by the system, minus the power consumed by the soil resistance:

$P_{tp} = P_t - R_s I_t^2$

And that the resulting power must be consumed either by plant N, or by all the other plants, but plant N:

$P_{tp} = R_n I_n^2{}_1 R_{Eq_{t-n}} I_{t-n}^2$

Therefore, the power available to kill any specific plant is determined as total power minus power lost in the soil, minus power used to electrocute other plants.

$R_n I_n^2 = P_t - R_s I_t^2 - R_{Eq_{t-n}} I_{t-n}^2$

According to Ohm's law, that can also be viewed as:

$V_p^2 / R_n = V^2 / R_t - V_s^2 / R_s - V_p^2 / R_{t-n}$

Therefore, it can be concluded that energy consumption by the plant N is:
- proportional to total Power: $V^2$
- proportional to time of exposal: t
- inversely proportional to velocity of application, which implies a proportional reduction of time of exposal;

So, it can further be concluded that, under then proviso of no further changes:
- higher soil resistance diminishes efficacy;
- higher plant N resistance diminishes efficacy;

higher resistances on the plant system, excluding plant N increases efficacy.

It can also be concluded that a system with plants with similar electrical resistances and similar air/root systems will have a more evenly distributed efficacy.

In a further demonstration, light is shed on the efficacy with different kinds of power usage. In Japanese patent JP 19991130 Sayyou studied plant electrocution up to ~1 kHz and found out that the efficiency increases with frequency up to about the same efficiency of the DC. In recent trials, Sayyou found that it stabilizes at about that same efficiency, even if higher frequencies are used. The content of disclosure of Japanese patent JP 19991130 shall be part of the current disclosure.

From the teaching of Sayyou it is still an open question how different plants react with different frequencies when individual plants are taken into consideration. It is expected that different plants will have different resistive characteristics and, therefore, it would be a hard engineering challenge to change frequencies of application to suit every single plant when weeding larger quantities of plants at once.

Previous systems from the prior art usually were comprised of some or all of the following components: a sinusoidal power source for the system. This could usually be a generator group, an alternator coupled to a tractor, a power outlet or any other electrical power source. A CLR inductor to protect against over-current flows and increase power factor. This step of the circuit can also contain/include: fuses, a circuit-breaker, a thermo-magnetic circuit-breaker. Further a power control system comprised of solid-state relays or other PWM (pulse width modulator) or power control components, usually controlled by software or manual calibration. Further, a transformer system to ensure proper voltage for electrical weeding, usual power/voltage sinusoidal power sources are in the 100-1,000V range and electrical weeding requires 1,000-20,000V. And further, a rectification bridge composed of diodes and capacitors to reduce the need of different applicators, enhance weeding efficiency and performance and make it simpler to mechanically build applicators which poles are at same distance (and therefore approximately same electrical resistance) of each other.

There are issues and challenges of previously taught electrical weeding systems. Because of the electrical (instead of electronic) characteristics of most previous systems that work at relatively low frequencies (usually 50-65 Hz), those systems had: very high weight, were very large, did not self-adjust to avoid problems, enhance efficiency and efficacy, had no synergy with recent developments of new sensors and high power electronic technologies. Eventually no components are working in much higher frequencies.

Those characteristics caused other challenges that greatly limited this technology application into the market. Some of the most common issues:

The CLR (also fuses and thermal-magnetic circuit breakers) provides a strategy to limit current in the system overall, but does nothing to control it, nor to ensure the system works at or near optimum performance and energy consumption/quality;

High imperfections in application (some plants were not electrified because of the large "off" time) inherent to the low frequency of the power control systems, which cannot work in frequencies much higher than the power generation component (50-65 Hz); Difficulty to adjust proper current trough PWM, since the low frequency is translated as a high variation of energy consumption at the power generating component (alternator, power outlet, etc.);

Inherent impossibility to auto-adjust voltage to each varying plant-soil electrical resistance reality, in a way to ensure continuous power and/or appropriate power applied; large cycle and response time due to low frequency of the system (at the PWM control, which cannot have much higher frequencies than the power source) causes inevitable deviations from the nominal power (and therefore energy, efficiency and efficacy of the system)—the electrical resistance of the plant-soil system can change more rapidly than the system can self-adjust, especially if such equipment runs faster and/or has a large width;

Adjustments of the PWM in the frequency range of voltaic-arc (sparks) formation and above the time to de-ionize the air (0.1-100 ms) can influence the creation of undesired sparks that can start fires if the application is done over high amounts of dry organic matter;

Due to the inherent size, cost, weight and nature of the traditional 50-65 hz transformers, it is an engineering challenge to sub-divide the applicator into large amounts of transformers to be controlled individually—this causes uneven applications throughout the width of the system since a part of the applicator can have access to a completely different electrical resistance than another, causing some parts to apply too much power while others apply too little (possibly not enough to kill undesired invasive plants);

Traditional 50-65 Hz transformers are very heavy and expensive;

Because of lack of power control and lack of power consumption attenuation, the power consumption can change rapidly and back-influence the frequency of the power generation (frequency of the alternator)—this not only can damage the power generation components, but it can cause rapid changes on frequency and voltage throughout the system, since some alternators cannot self-adjust for voltage fast enough to account for the change;

The potential variations in voltage can cause problems or damages, especially at the power control systems (solid state relays) and rectification bridges.

Those problems above have different solutions, but it is important to consider most of the issues came from the fact that the previous technology was electric, not electronic and without any kind of telemetry or self-regulation.

In the following, an electronic weeding circuit is discussed. The basic circuit for such a system is comprised of at least two of the following components: An alternator or other AC power source, a CLR to limit current, a rectifier or rectification bridge to provide DC for the DC/AC converter (usually a rectangular-wave h-bridge inverter), a capacitor bank to provide and reduces the voltage ripple for the DC/AC converter (usually a rectangular-wave h-bridge inverter) and, a transformer. Alternatively, the alternator, the CLR and rectifier can be substituted by one single DC power source or similar.

Figure 2:
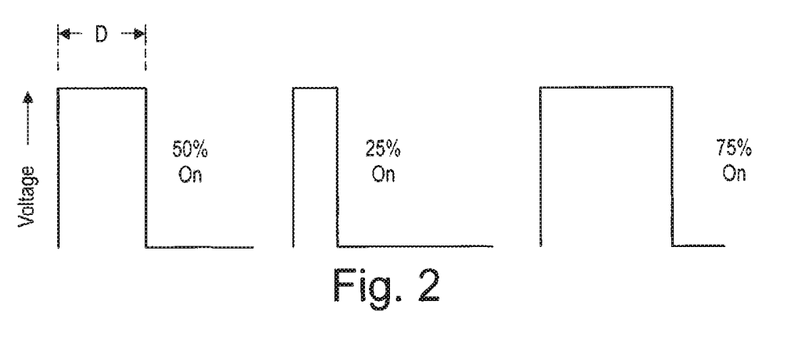
FIG. 2 shows an example of idealized PWM current control.

Inherently, this basic electric weeding circuit allows for the potential solution of the issues with previous electrical weeding circuit designs, as previously stated and described below. In previous systems operating in lower frequencies, the current control was traditionally done through the use of solid state relays. Those relays could not operate in frequencies much higher than the AC power source without interfering with each power source cycle (50-65 Hz). This could lead to high imperfections on application (some plants were not properly controlled because of the large "off" time). As an example: a onetime gap in a 50 Hz cycle in an equipment running at 5 km/h means an off length of 2.77 cm. Considering small plants can have less than 2.77 cm such a gap would entirely prevent some plants of being controlled through electrocution. As the current technological stage DC/AC converter (usually a square-wave h-bridge inverter) allows for frequencies in the order of 1 kHz to 1 MHz, problems related to low frequency of the current control system are not relevant when using the current control technology proposed here. The idea is to control the pulses at the DC/AC converter (usually a square-wave h-bridge inverter), and therefore the overall current of the system, which has never been used before for electrical invasive plant control. A simple example of idealized PWM current control is shown in FIG. 2.

If worked with no buffer, large on-off periods (especially if superior to 10 ms) can cause a huge difference in power consumption at the power generating component. This difference can be translated into mechanical and electrical component stress and loss over heat. High times of off periods to control for average current (point above) can cause that, but so can other controls over the PWM, such as spark control, over current protection shutdowns, etc. This effect is greatly attenuated through the capacitor bank, which performs as an energy consumption buffer between the power source and the DC/AC converter (usually a square-wave h-bridge inverter). In short periods of time, the capacitor bank serves as a reserve of energy if consumption is momentarily greater than generation and the other way around. The down side of this system is the high current flow into the capacitor bank to make the initial charge when starting or re-starting the system. When starting or re-starting the equipment, the current flow into the capacitor bank can be very high and demanding on the power generating components.

To attenuate this, it is necessary to have a consumption attenuator at the capacitor bank charging moment. This can be controlled electronically or through a simple resistive circuit.

Figure 3:
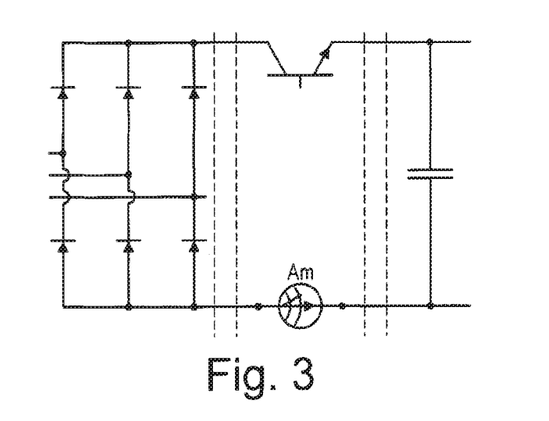
FIG. 3 shows a high-power and high-speed transistor for controlling the PWM in very high current consumption moments.

The electronical solution comprises a high-power and high-speed transistor (Mosfet, IGBT, etc.) to control the PWM in the very high current consumption moments. This transistor is to be controlled by the control system and provide a warranty that the power generating components will not suffer over-current issues, FIG. 3. This particular current control Capacitor Bank Consumption Attenuator IGBT can be controlled dynamically from the output of an ammeter with a digital signal coupled with the control system or just become active whenever the system starts or re-starts. An idealized example of how much current can go through, once the Capacitor Bank Consumption Attenuator is at work. Frequency of modulation for the Capacitor Bank Consumption Attenuator band should be 1 kHz-1 MHz.

Figure 4:
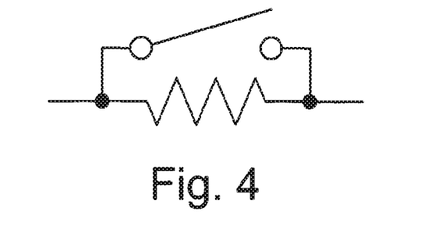
FIG. 4 shows a switch configuration having a resistive path and a short circuit.
Figure 5:
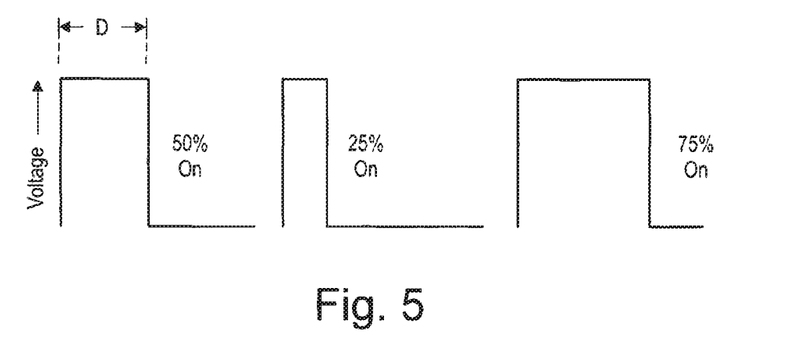
FIG. 5 shows an ammeter readout for the actuation of the switch of FIG. 4.

Alternatively, a cheaper and more robust solution is to have a pre-charge circuit that ensures that, when the current is too high, the charging goes through an electrical resistance that diminishes the current flow. After the capacitor bank reaches a certain level of charge and the power source can provide enough current, the circuit is closed (short circuited around the electrical resistance). See FIG. 4. The control of the switch that allows free flow around the resistance can be done automatically through the reading of an ammeter that provide info about the current consumption, through a timer when starting or re-starting, or a combination of both. See FIG. 5.

Figure 6:
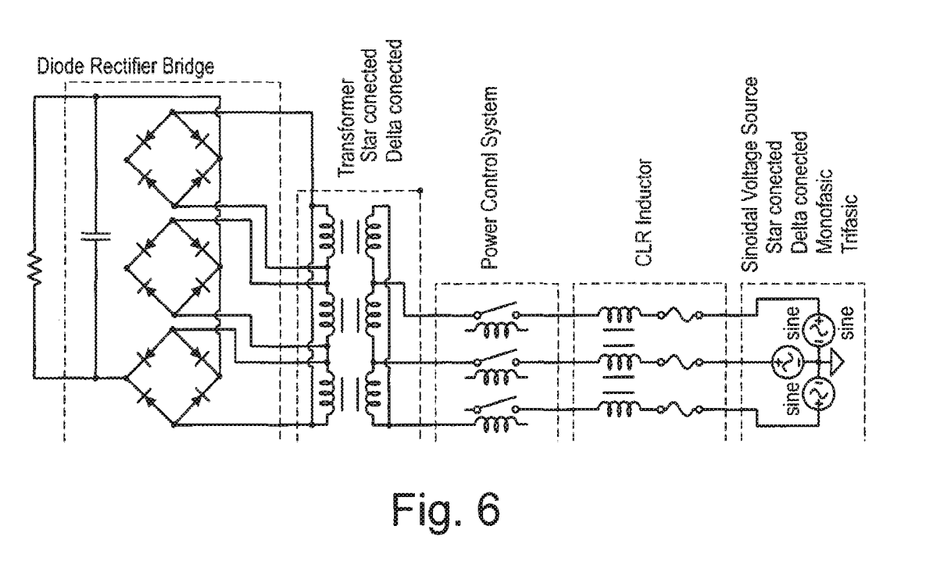
FIG. 6 shows a simplified circuit for the single commutation of one transformer.
Figure 7:
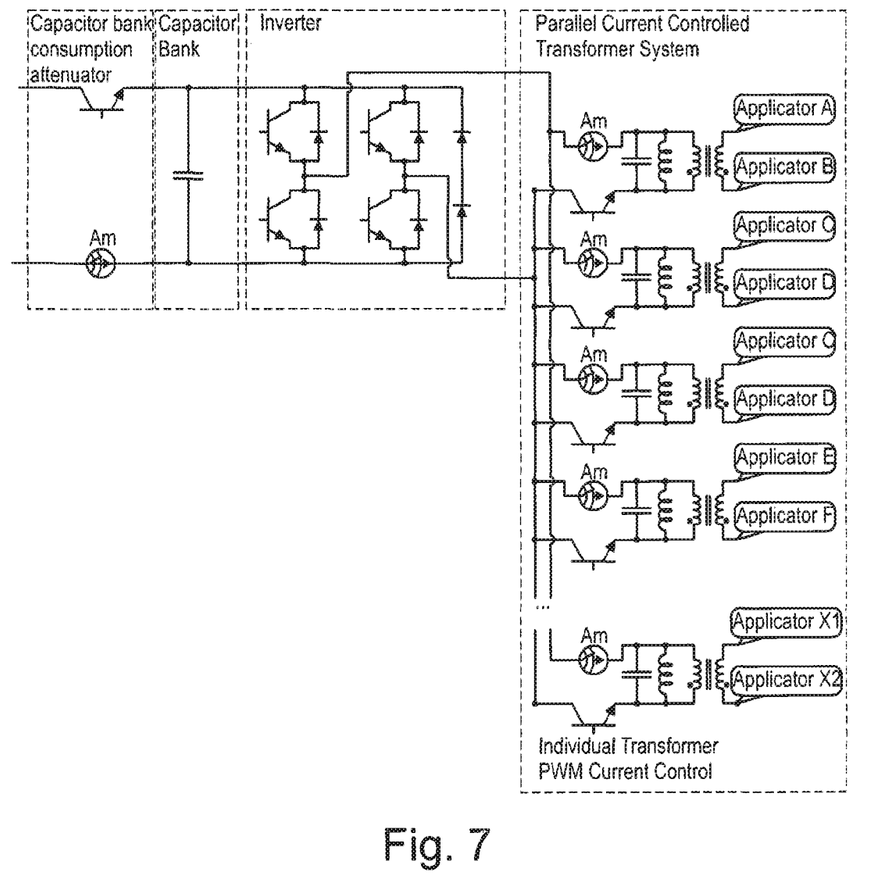
FIG. 7 shows a simplified circuit.

Although the first approach to multiple electrodes was done in the Brazilian patent PI 0502291, there is a crucial difference between the teaching of PI 0502291 and the current methods. Due to the large size of the traditional 50-65 Hz transformers, it is difficult to control the energy at smaller segment, which would have to be connected to only one transformer each, not to cause back-flow from one transformer into the other. This causes the application quality to be un-even, especially when some plants provide a low electric resistance path, leaving other plants without enough energy for a good quality control in the whole width of the applicator. This technology alternates full power through each transformer and respective electrode in the system, "concentrating" the energy into a diminished amount of plants each commutation cycle, which should be between 0.01 and 2.0 seconds. This technology has the stated objective of diminishing the total amount of energy needed to electrocute a large number of plants simultaneously. Although the claim has practical value for 50-65 Hz systems with few transformers, the technology greatly limits the potential number of transformers that can be used simultaneously: If there is x transformers, for it to be possible to commutate one transformer individually, there is a need to turn off x−1 transformers. In a practical example of having 50 individual transformers (the case for potential equipment for extensive area soybeans in Brazil, for example) to be controlled individually, even when using the minimum amount of "on time" commutation for each transformer (0.01 second), it would take 0.5 seconds to the same electrode to be active again. If said equipment were to travel at 5 km/h (1.4 m/s), which is reasonably standard speed for agricultural equipment, the example's electrode segment would have gone through 0.7 meters before being active again. As most invasive plants to be controlled or electrocuted are below 0.7 m in size, this method is unrealistic for larger amounts of parallel transformers/14069959.1 electrodes segments. Moreover, the system considered a three-phase transformer, which needed an AC/DC converter to minimize the needs of electrodes for each transformer. A transformer would need three different points of contact (A, B and C)—electrodes—which made it convenient for the AC/DC converter, since it diminished this amount to two electrodes (+ and −). Simplified circuit for the single commutation of one transformer using the technology described at the PI 0502291, in the range of 2-100 Hz (0.01-2.0 seconds), is shown in FIG. 6. Alternatively, the technology described here does not preconize commutating "on" only one individual transformer at a time. Through a similar technology stated at the Capacitor Bank Consumption Attenuator, the individual transformer current control (Pulse Density Modulation PDM) proportionate an individual current control for each transformer and its correspondent electrode. The Individual transformer current control modulates the cycles themselves, since the frequency of the individual transformer current control is to be smaller than the frequency of the system DC/AC converter (usually a square-wave h-bridge inverter). A simplified circuit is shown in FIG. 7.

Figure 8:
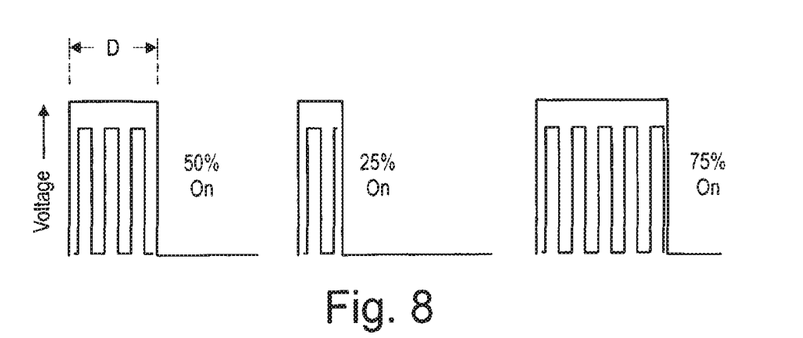
FIG. 8 shows an idealized PWM format of the combined PWM from the DC/AC converter and the individual transformer PDM current control.

An idealized PWM format of the combined PWM from the DC/AC converter (usually a square-wave h-bridge inverter) and the individual transformer PDM current control are shown in FIG. 8.

Unlike the Capacitor Bank Consumption Attenuator, which modulates DC through PDM and the technology described at PI 0502291—Electronic commutation equipment for the electrocution of weeds, which modulation is in approximately the same frequency range as the main frequency (0.5-100 Hz and 50-65 Hz), the Individual Transformer PDM Current Control modulates at the proposed range of from 100 Hz to 10 kHz. This frequency itself, although necessarily smaller than the DC/AC converter (usually a square-wave h-bridge inverter) frequency, is in a much higher range than the one proposed at the PI 0502291—Electronic commutation equipment for the electrocution of weeds. To consider that at that time there were no available cheap technology to make a PDM at the frequency proposed by the Individual Transformer PDM Current Control.

Considering that, ceteris paribus, transformer size is inversely proportional to frequency, higher frequency DC/AC converters (usually a square-wave h-bridge inverter) (1 kHz-18 kHz or above) allows for the use of much smaller transformers, making it feasible and possible to use a larger number of smaller power transformers.

Figure 9:
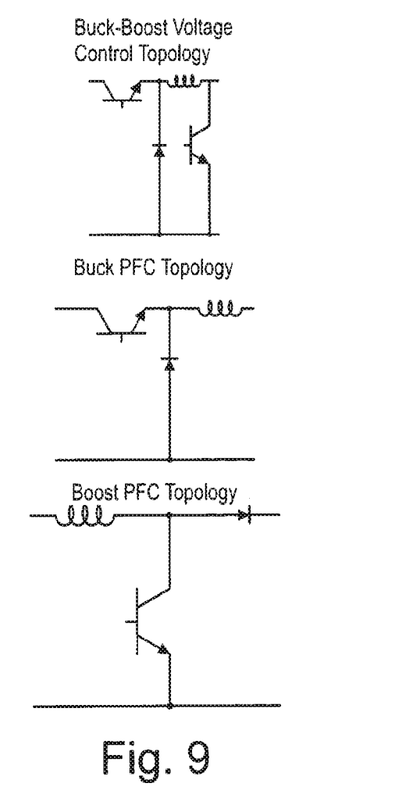
FIG. 9 shows a Boost, Buck or Buck-Boost PFC circuit topography.

The combination of the Individual Transformer PDM Current Control and the use of higher frequencies DC/AC converters (usually a square-wave h-bridge inverter) makes it possible to not only divide the power between the segments, but to control the current at each segment individually with dynamic precision through the PWM control of the AC of the output of the DC/AC converter (usually a square-wave h-bridge inverter). There are two main reasons for the adoption of this topology, which has never been used before for electrical invasive plant control: Reduction of transistor stress and the possibility to dynamically adjust the voltage in the DC input of the DC/AC converters (usually a square-wave h-bridge inverter), adjusting voltage input at the primary of the transformer (therefore in the secondary as a result) to ensure the continuity of a stable power at the transformer secondary, even with a dynamic and rapidly changing electrical resistance (plant-soil electrical resistive system), which is made through a Boost, Buck or Buck-Boost PFC circuit topography, FIG. 9. The output load behaves like a variable resistance, so when the resistance value decreases, the secondary current increases proportionally, leading to the necessity of decreasing the secondary voltage to keep the same power. The control strategy functions to keep the system operating in these conditions: when the load current value changes, the transistors at those specific PFC circuits commanding the control strategy will change parameters, modifying the DC output voltage, and adapting its value to keep constant the power transferring to the load.

Rectangular wave usage at high frequency transformers: This is the waveform an inverter can produce. The downside is that the rectangular waves have harmonic components that can drastically change voltage behavior in the transformer secondary coil, especially when it faces open circuit.

Figure 10:
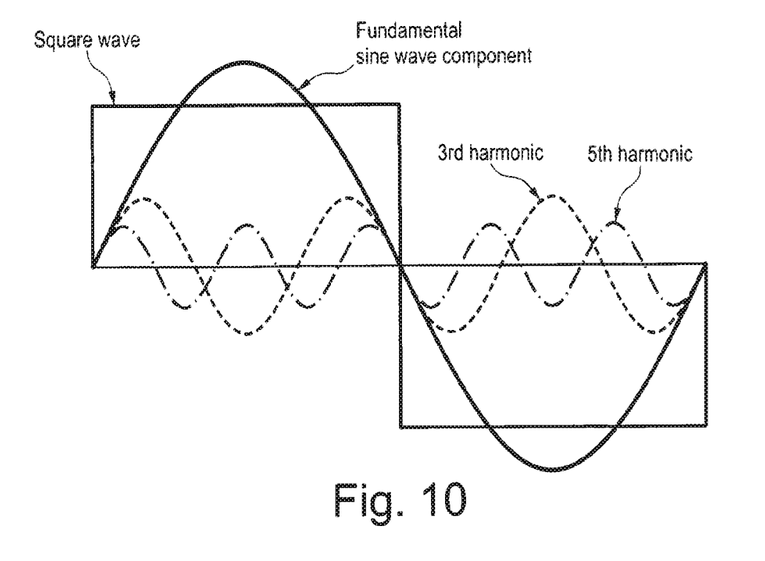
FIG. 10 shows the peaks caused by the harmonic interactions.

As any electrical weeding system might go through a very high electrical resistance patch, this can be seen, from a secondary transformer coil standpoint, as an open circuit. This fact makes the presence of a Voltage Peak Limitation Strategy key for a safe use of any such equipment. The peaks caused by the harmonic interactions are exemplified in FIG. 10.

The series resonance (between leakage inductance and winding capacitance) is excited in an open load situation, causing large voltage peaks and undesired behavior.

Figure 11:
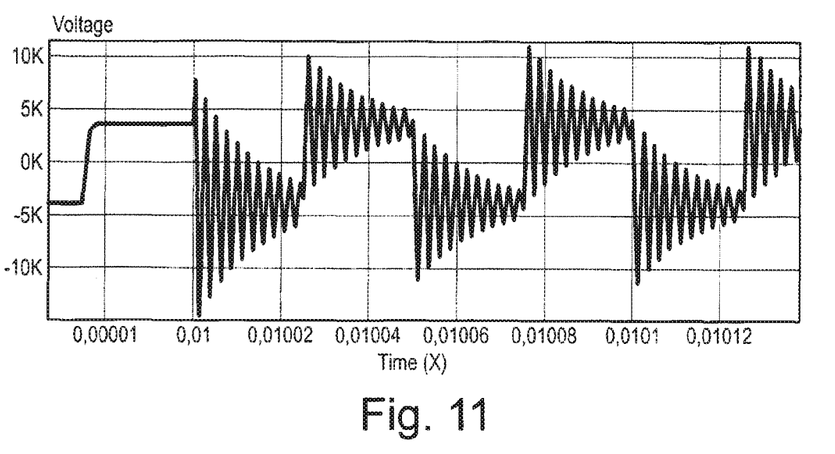
FIG. 11 shows the secondary voltage for a transformer, for nominal load which occurs in an open load situation.

The Figure below shows the secondary voltage for a transformer, for nominal load when occurs an open load situation. The voltage peaks reach more than 10 KV, when the nominal output expected was less than 5 kV (FIG. 11).

There are three alternatives for the limitation of those peaks. As the first alternative, if the transformer has a small leakage inductance, an external inductor can be added in series with the transformer and used to clamp the voltage peaks in a maximum equal to the DC link. This solution has the advantage of being very robust, but the disadvantage of requiring a low magnetic dispersion transformer to work properly and reduces the power available to be transferred, due to the voltage peak reduction in nominal conditions.

Figure 12:
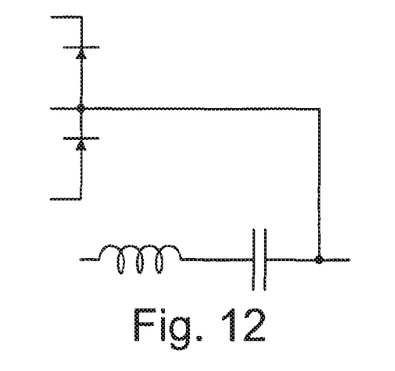
FIG. 12 shows a simplified circuit design.
Figure 13:
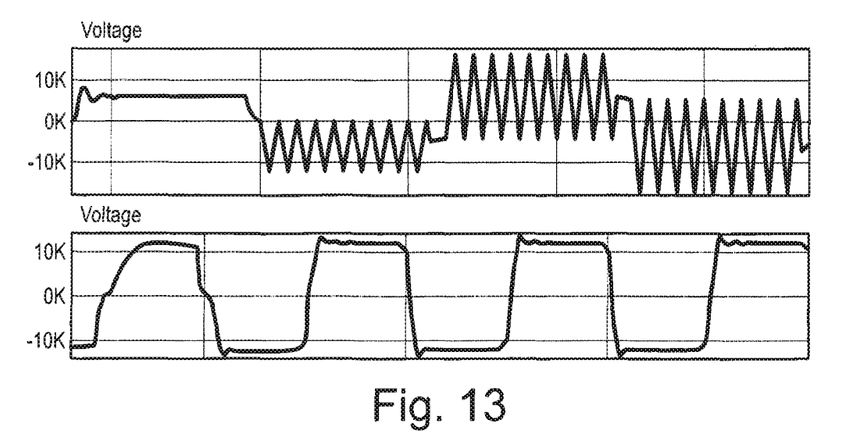
FIG. 13 shows the voltage load without (top) and with (bottom) the protection system of FIG. 12.

A simplified circuit design is shown in FIG. 12: A simulation for a given transformer of the voltage wave format without (above) and with (below) this protection system. First, there's a load in the secondary winding, and after the open load happens as shown in FIG. 13.

Figure 14:
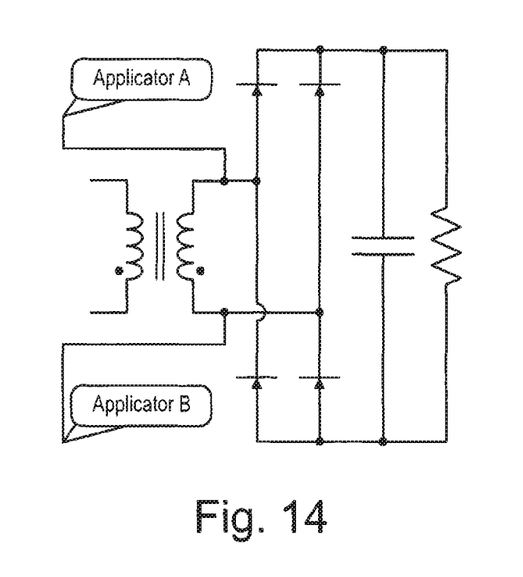
FIG. 14 shows a simplified circuit design.
Figure 15:
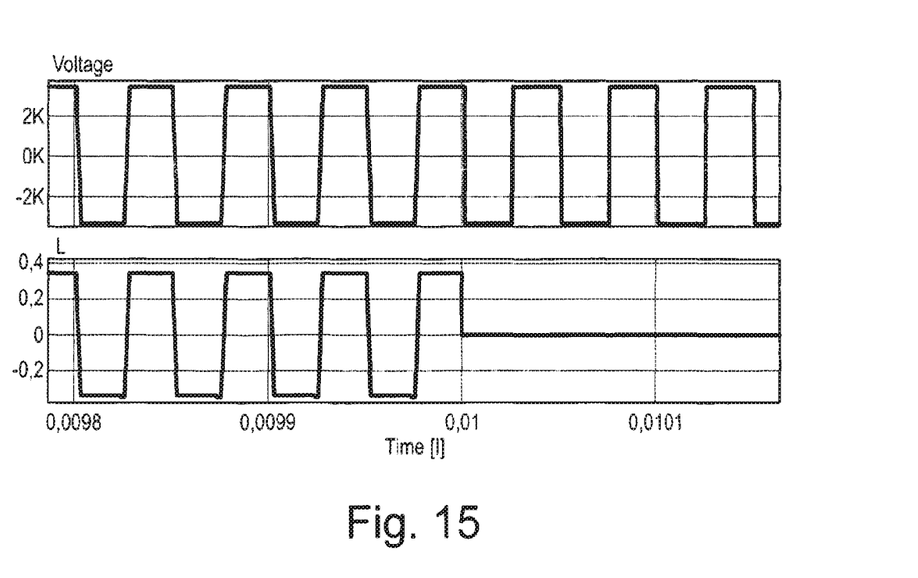
FIG. 15 shows the wave functions with and without load through the simplified circuit design of FIG. 14.

To avoid the voltage peaks, the second alternative is to add a rectifier circuit in parallel with the electrodes at the secondary coil of the transformer. This solution allows for very good and precise maximum voltage limitation, but has the disadvantage of requiring (usually expensive) fast diodes for high frequency systems. The resistor R must be high enough to limit V and not dissipate too much power, FIG. 14. Wave functions with and without load are almost the same, with no significant added voltage, FIG. 15.

Figure 16:
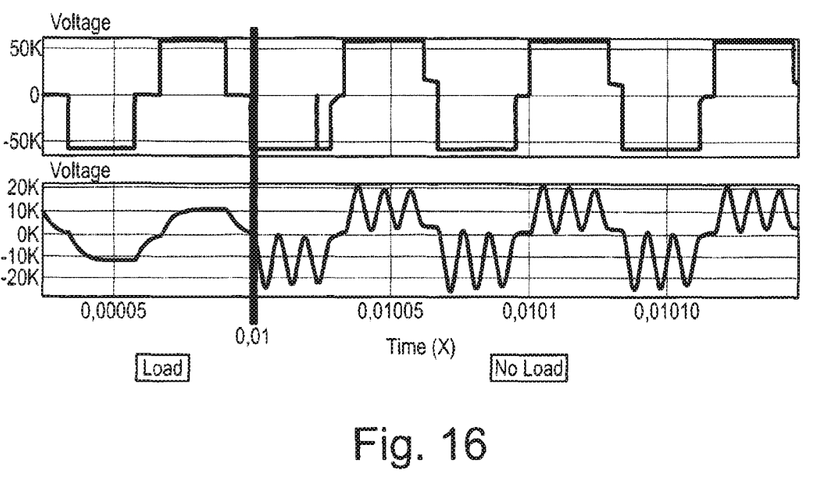
FIG. 16 shows voltage increase with the controlled rectangular wave is limited to the effect of the lower harmonics, when there is no load through the simplified circuit design of FIG. 14.

As the third alternative, the strategy used in this case is to take out the harmonic component from the primary voltage, through PWM control, making a quasi-rectangular wave. This will reduce the resonance excitation and consequently the overvoltage peak. The wave has a step of zero voltage that matches the most problematic harmonic component. The advantage is that this solution needs no added hardware, but the disadvantage is that it provides a poorer voltage limitation and depending on the time and extension of the zero-voltage step in each wave, it might harm the total power the transformer can deliver and the power density of the system. Voltage increase with the controlled rectangular wave is limited to the effect of the lower harmonics, when there is no load, as shown in FIG. 16.

The new and innovative circuits, software and the development of new materials (e.g. Silicon carbide for semiconductors and Crystal Ferrite for permeable magnetics) allows the use of high performance HFT (High Frequency Transformer). An usual ratio of the technology developed could be considered to be 1 Kg/KVA (0.11/KVA volume density), already considering inverter weight. This is a one order of magnitude reduction from the 10 Kg/KVA power density of traditional 50-65 Hz transformers. The performance of the system reduces as frequency increases, because heat dissipation increases with higher frequencies at the inverter—which is undesirable. The size and cost of the transformer de-decreases as frequency increases (up to a point)—which is desirable.

Transformer size and cost reduces as frequency increases with diminished marginal influence. This is caused because of the set area reserved by insulating materials, which cannot be reduced with higher frequencies and the skin effect, which increases the volume of the wire needed with higher frequencies. An alternative to reduce the increase of the volume of the wire needed is to use litz wire, but the reduction has a limit since each wire of the composition must be individually insulated with space consuming coatings.

Because of these two facts, there is an optimum range of frequencies where it is possible to combine low weight, low cost and high efficiency. With the usage of Silicon Carbide (or similar materials) IGBT inverters and Crystalline Ferrite magnetic permeable transformer cores, this optimum range is 15-35 KHz, being reasonable values varying from 1-100 KHz.

Each transformer topology has a different cost-benefit relation to different frequencies, but all possibilities put together create, not an optimum frequency, but an optimum range of 15-35 KHz.

Figure 17:
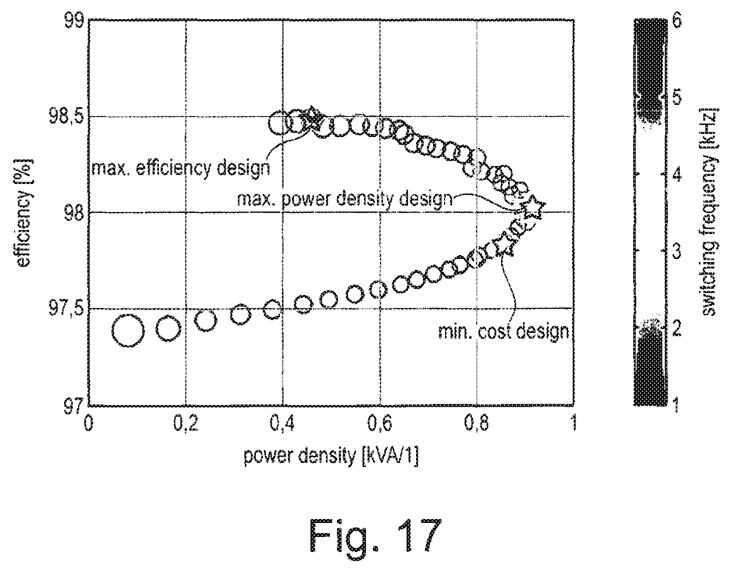
FIG. 17 shows research results for the min cost, max power density and max efficiency between 3 and 5 KH using a comparable HFT parameter.

As an example of how this relation behaves at a given fix HFT, at the "Volume/Weight/Cost Comparison of a 1 MVA 10 kV/400 V Solid-State against a Conventional Low-Frequency Distribution Transformer" paper from Jonas E. Huber and Johann W. Kolar, at the Power Electronic Systems Laboratory, ETH Zurich. The researchers, using a different, but still somewhat comparable HFT parameter, got the min cost, max power density and max efficiency between 3 and 5 KHz, as shown in FIG. 17. Of course, this changes from chosen parameters, but the concept is valid throughout any construction.

Although composed only of Coil/reel system, wire, core, connectors and encapsulation, a high frequency high power transformer construction is state of the art technology. At the same construction, you have to take into consideration a large array of inter-related variables that does not interfere with each other in a linear manner. The individual parts and the relation between them must take into consideration variables such as (just to name a few): Skin effect losses, Internal ca, acutance, Winding ratio, Thermal dispersion, Magnetic dispersion, Core magnetic permeability, Core physical resistance, Potential corona effects, Winding window optimum size, Core shape, Serial harmonics, Parallel harmonics, High voltage insulation at small spaces, Layer division, Resin viscosity.

Figure 18:
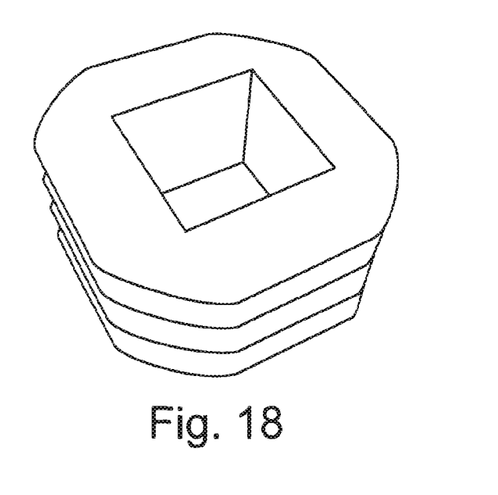
FIG. 18 shows an example of a 3 slot reel structure.

To diminish the magnetic dispersion, the coupling between primary and secondary must be very high and precise. Traditional coils are winded one in top of the other, with protective insulating papers between layers, and this construction promotes little magnetic dispersion. In the HTF that is not possible because it generates too much internal capacitance, which therefore generates internal current, heat and power loss. Creating vertical slots are used in some high tension transformers, but in the HTF the needed number of layers is not viable, because of the combination of small size and high tension. Therefore, the solution is to combine intercalated 3-7 secondary-primary-secondary organized slots with insulating paper between them. This seemingly simple solution warranties low magnetic dispersion with low internal capacitance. Such solution has never been used before for electrical invasive plant control transformer construction. A 3 slot reel structure example is shown in FIG. 18.

Higher frequencies increase skin effect, causing current to flow through disproportionally through the outer part of the wire, instead of evenly throughout. Because of that, the wire must be litz organized. Litz wire consists of multiple strands insulated electrically from each other.

This fact also limits frequency once for higher frequencies—larger amount of wires would be needed and that reduces the ratio conducting/insulating material, since smaller wire gauges have more insulation for the same amount of conductor (the wires composing the litz must be insulated from each other, otherwise they would behave as just one wire) Infinite frequency would require infinite amount of insulating materials to insulate the wires in the litz organization.

As an example of the effect this have at higher frequencies, below there is a representative parameter data for 24 gauge PIC telephone cable at 21° C. (70° F.):

| Frequency (Hz) | R (Ω/km) | L (mH/km) | G (µS/km) | C (nF/km) |
|---|---|---|---|---|
| 1 | 172.24 | 0.6129 | 0.000 | 51.57 |
| 1k | 172.28 | 0.6125 | 0.072 | 51.57 |
| 10k | 172.70 | 0.6099 | 0.531 | 51.57 |
| 100k | 191.63 | 0.5807 | 3.327 | 51.57 |
| 1M | 463.59 | 0.5062 | 29.111 | 51.57 |
| 2M | 643.14 | 0.4862 | 53.205 | 51.57 |
| 5M | 999.41 | 0.4675 | 118.074 | 51.57 |

Figure 19:
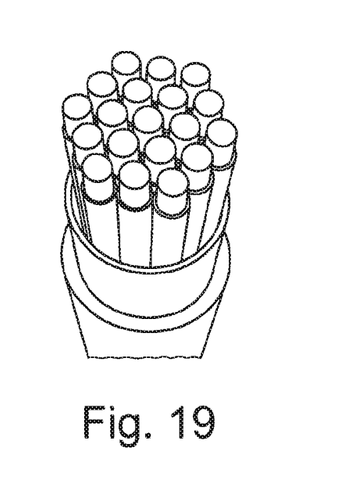
FIG. 19 shows a cross-section of the litz wires.

This seemingly simple solution (litz wires) is the key for the use of high frequency transformers, once it greatly increases the surface area of an orthogonal cut, therefore increasing max current that can go through a high frequency wire of a set radius. Such solution has never been used before for electrical invasive plant control transformer construction. Ordinarily the strands are twisted or woven, but no twisting is shown in FIG. 19.

Figure 20:
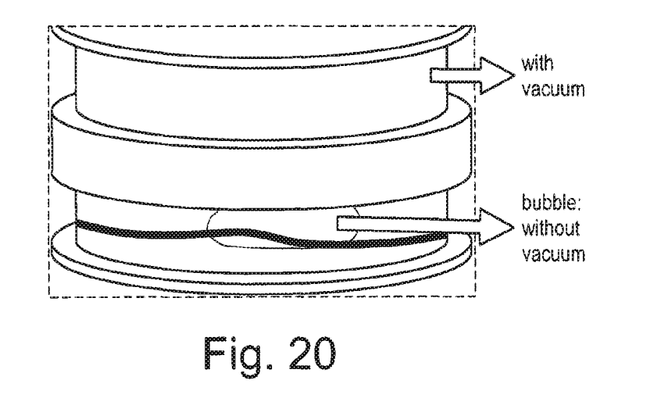
FIG. 20 shows how the use of a vacuum bag during electronic vacuum encapsulation ensures that there are no air bubbles or empty space inside the transformers.

Usually electronic vacuum encapsulation happens using a simple pouring in container method. This is easy and cheap to do, but presents two issues with the HTF: It creates a large resin layer that thermally insulates the transformer, causing it to unavoidably overheat over time, it does not penetrate deeper layers, because of the small size and closeness of the components. Because of those facts, a vacuum bag is used, where the resin remains in normal air pressure. The low viscosity resin entrance must be at the lowest central point of the reel and the vacuum suction at the highest central point to ensure the resin goes through all the transformer volume before reaching the air exit point. The flow goes against gravity to ensure no air bubbles. This process ensures there is not only no air inside the transformer, but also no empty space. Both of which could contribute for corona effects and insulation problems. Bags and forms can be used. Bags have the advantage of no extra resin being necessary and forms have the advantage of being reused multiple times. See FIG. 20.

On the one hand, the sensors determine the structures (weeds) that are to be killed electrically, but at the same time they are also able to determine the structures (useful plants) that are to remain. This means that the purposeful destruction of structures is sufficient, whereby the useful structures are allowed to remain and do not to be killed.

Such control circuit is already inbuilt in the individual transformer power control technology, needing only the external sensor to make it work. This also means that the carrier vehicle travels in such a way that it reaches the weed structures with its applicators and does not harm useful structures, regardless of whether the vehicle is partly autonomous or autonomous. Such systems exist for autonomous driving in general, but so far not in connection with electrocution.

Moreover, as the concept is to electronically control the weeding parameters (frequency, current, voltage, voltage peaks, power, energy, mechanical location of the electrodes, continuity of the application and sparks) through a programmable integrated circuit (PIC), this opens the possibility of including sensors into the technology that influences the parameters in a way that allows for new, more precise, more efficient and higher efficacy uses.

The invention claimed is:
1. A weed inactivation device, comprising at least two electrodes, whereby at least one electrode is directed to a weed, wherein, the at least one electrode is supplied with electrical energy by at least one electrical power supply, the electrical power supply comprising:

at least one electronic h-bridge inverter for DC/AC conversion, creating a rectangular wave AC-current, the pulses at the electronic h-bridge inverter being controlled such that the overall current of a control system of the weed inactivation device is controlled; whereby the DC/AC conversion takes place at frequencies above 1.0 kHz;

at least one transistor connected to the control system that is further configured for providing a pulse density modulation (PDM), and a parallel current controlled transformer system comprising a plurality of individual transformers, wherein the at least one electronic h-bridge inverter connected to the control system that is further configured for providing a pulse width modulation (PWM), and wherein the combination of the individual transformer PDM current control and the electronic h-bridge inverter divides the power between the electrode segments and controls the current at each electrode segment individually with dynamic precision trough the PWM control of the AC of the output of the electronic h-bridge inverter.

\* \* \* \* \*

UNITED STATES PATENT AND TRADEMARK OFFICE
CERTIFICATE OF CORRECTION

PATENT NO. : 11,684,060 B2
APPLICATION NO. : 16/611401
DATED : June 27, 2023
INVENTOR(S) : Sergio De Andrade Coutinho Filho It is certified that error appears in the above-identified patent and that said Letters Patent is hereby corrected as shown below:

In the Specification

Column 8, Line 39. The number "14069959.1" should be deleted.

Signed and Sealed this
First Day of August, 2023

Katherine Kelly Vidal
*Director of the United States Patent and Trademark Office*